No. 787,262.

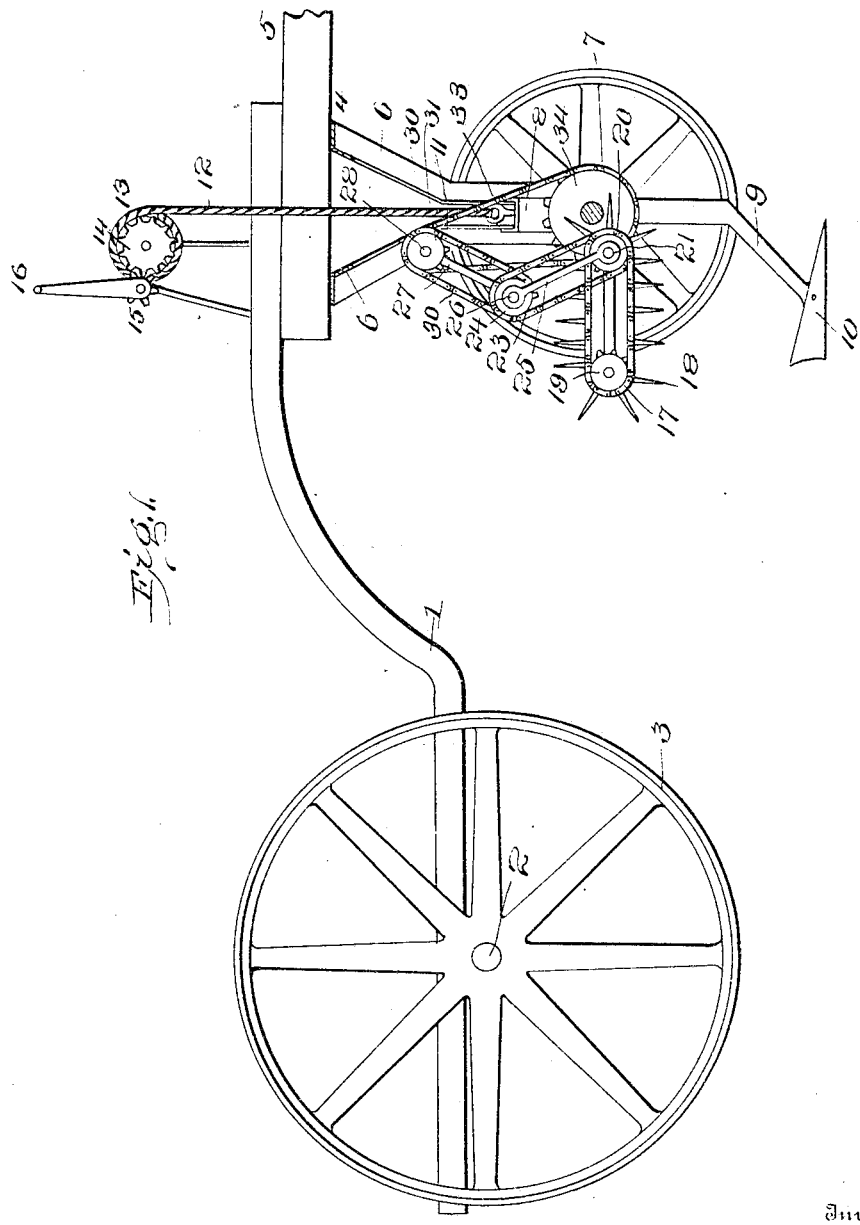

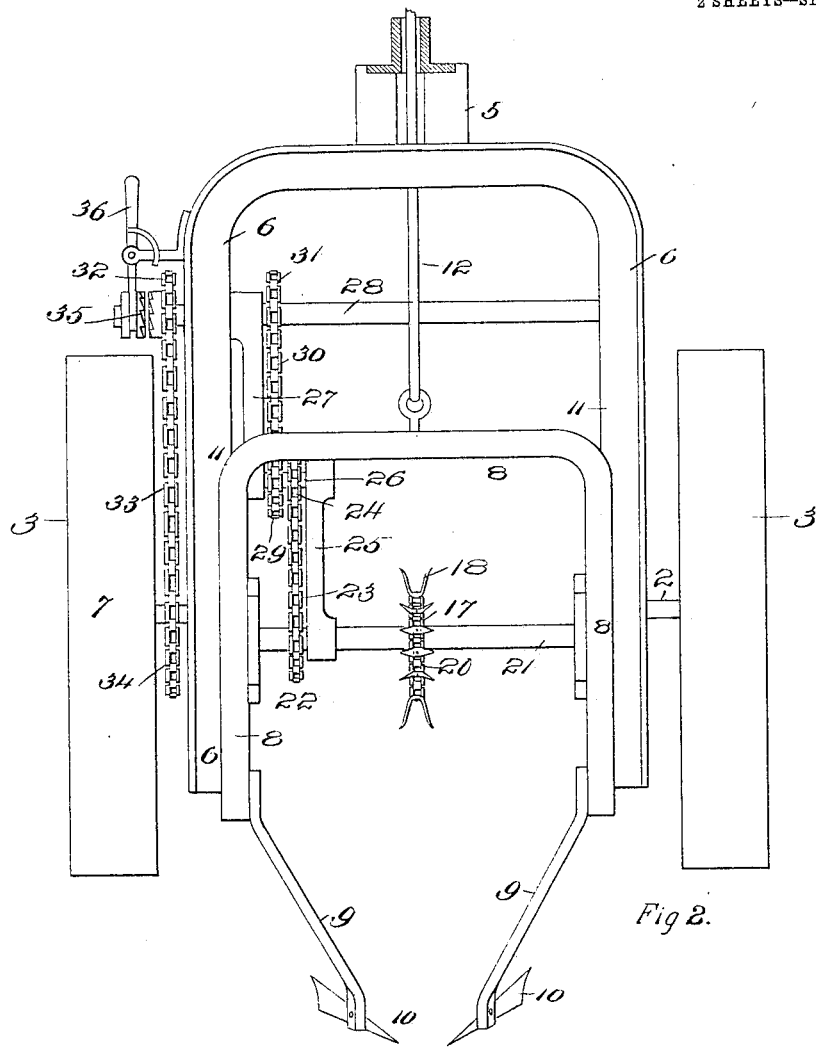

Patented April 11, 1905.

UNITED STATES PATENT OFFICE.

JOHN BEAL, OF DENVER, COLORADO.

BEET-HARVESTER.

SPECIFICATION forming part of Letters Patent No. 787,262, dated April 11, 1905.

Application filed February 17, 1904. Serial No. 194,051.

*To all whom it may concern:*

Be it known that I, JOHN BEAL, a citizen of the United States, residing at Denver, in the county of Denver and State of Colorado, have invented certain new and useful Improvements in Beet-Harvesters; and I do hereby declare the following to be a full, clear, and exact description of the invention, such as will enable others skilled in the art to which it appertains to make and use the same.

This invention relates to improvements in harvesting machinery, and is so constructed as to loosen and remove the beets from the ground.

The invention consists in a harvesting mechanism comprising adjustable means carrying plows and mechanism for pulling the beet-plants to insure their removal from the ground.

It also consists in certain other novel constructions, combinations, and arrangements of parts, as will be hereinafter fully described and claimed.

In the accompanying drawings, Figure 1 is a side view, partially in section and partially in elevation, of my improved beet-harvester. Fig. 2 is a front end elevation of the said harvester. Fig. 3 is a detail view showing side and end elevations of the beet-engaging links of the beet-engaging chain employed in the beet-harvesting machine.

My improved beet-harvesting mechanism is so constructed as to be capable of loosening rows of beets in the ground and then engaging the plants, so as to pull the beets to the surface of the ground, after which they may be engaged by an elevating mechanism.

In the accompanying drawings I have illustrated a practical embodiment of my invention, the machine being preferably constructed with the main frame 1, carried at the rear by an axle 2, which may be provided with traction-wheels 3. The front end of the frame 1 is supported by a truck 4, said truck being formed with a suitable guiding-tongue 5, to which a team or other propelling mechanism may be attached, as preferred. The truck 4 is made up of a yoke or arch 6, which is supported upon wheels 7. A sliding yoke or arch 8 is mounted in the yoke 6 and carries at its lower ends downwardly-extending plow-standards 9, to the lower ends of which are secured plows 10, such as are commonly used for loosening beets in the ground, the said plows tending to throw the beets to the surface. A simple manner of constructing the yokes or arches 6 and 8 is illustrated in the drawings. The yoke or arch 6 is preferably formed of angle-iron pieces spread at their upper ends, where they are secured to the tongue 5, while their lower ends are applied together so that their meeting flanges form a guide 11 upon the inner surface of each leg of the yoke or arch. The yoke 8 is preferably formed of channel metal or iron, the flanges being turned outwardly, so as to engage at the sides the guides 11 of the outer yoke or truck-arch. The inner yoke or arch is suspended by a cable or other flexible means 12, which extends upwardly to a windlass or drum 13, mounted upon the frame 1. The drum is secured to a gear 14, which meshes with an actuating-pinion 15, mounted adjacent thereto. A handle 16 is provided for turning the said pinion 15, and by this means the inner yoke or arch may be raised or lowered and held at any intermediate point. A pawl or any suitable mechanism may be employed for holding the gears in their various adjustable positions. The front truck also carries means for engaging the leaves or tops of the beets, and thereby drag the beets completely out of the ground. This mechanism consists in an endless chain 17, provided with prongs or yokes 18 for engaging the beet-plants, the said chain traveling upon sprocket-wheels 19 and 20. The sprocket-wheel 20 is carried by the shaft 21, extending transversely of the yoke or arch 8, and the said shaft is provided with an actuating-gear 22, which is connected, by means of a sprocket-chain 23, with a sprocket-wheel 24. An arm or bar 25 spaces the shaft 21 from a short shaft 26, which carries the sprocket-wheel 24. The short shaft 26 is carried by an arm 27, which is carried in turn by a shaft 28, mounted in the outer yoke or arch 6 of the front truck. The sprocket-wheel 29, secured to the shaft 26, is connected, by means of the sprocket-chain 30, with a sprocket-wheel 31, secured to the shaft 28. One end of the shaft 28 projects beyond one side of the yoke or arch 6 and is provided with a sprocket-wheel 32, which is connected, by means of a sprocket-chain 33, with the sprocket-wheel 34, carried by the axle of one of the front-truck wheels 7. The sprocket-wheel 32 runs loosely upon the shaft 28, but is easily connected therewith, so as to revolve said shaft 28 by means of a clutch 35, which engages the hub of the sprocket-wheel 32. An operating-lever 36 is mounted upon the yoke 6 for operating the clutch 35. The plant-engaging sprocket-chain 17 is arranged about on the median line of the machine, so as to occupy a position just above the space between the two plows 10 10. The gearing for operating the said chain, as just described, may be located to one side of the yokes 6 and 8, as illustrated in Fig. 2. The jointed connection between the chains 22 and 30 as secured by the shaft 26 makes it possible to raise and lower the inner yoke 8 without disturbing the actuation of the chain 17. In the operation of this part of the mechanism the frame, yoke, or arch 8 is lowered, by means of the handle 16, to a suitable depth for the plows 10 to engage the ground upon each side of a row of beets. The plows are set at such an angle that they not only loosen the beets in the ground, but tend to throw them upwardly out of the ground. At the same time the chain 17 is actuated through the mechanism above described, and its prongs 18 engage the tops of the plants and pull the beets entirely out of the ground. In this way the beets are left in proper position to be engaged and lifted into the rear portion of the machine.

The mechanism above described is capable of being moved along the rows of beets in a beet-field, loosening and throwing the beets to the surface, while the tops of the beets are immediately engaged by the endless chain 17, directed to the surface and clear of the ground. In this manner the beets are placed with certainty in a position to be engaged by whatever elevating and collecting means may be employed.

The parts of the machine are simple in construction and easy of manipulation and will be found exceedingly effective for the rapid removal of beets.

Minor changes in the details of construction may be made without departing from the spirit of the invention.

Having thus fully described my invention, what I claim as new, and desire to secure by Letters Patent, is—

1. A beet-harvester comprising a truck formed of structural material and having the webs thereof turned inwardly to form guiding means, and an implement-holding frame engaging said guiding means, and means operable for raising and lowering the implement-carrying frame upon the guides of the truck.

2. A beet-harvester comprising a truck formed of structural material angular in cross-section, the said truck having inwardly-extending web portions and outwardly-extending flanges, a sliding frame formed of structural material, the flanges of which engage the webs of the truck, ground-engaging implements carried by the sliding frame, and means operable for raising and lowering the sliding frame upon the guides of the truck.

3. A beet-harvester comprising a truck, formed of bars spread apart at their upper ends and drawn together at their lower ends for forming guides and a sliding frame having flanges for receiving the guides upon the truck, and means operable for raising and lowering the frame upon said guides.

4. A beet-harvesting mechanism comprising a truck having depending guiding side portions, an adjustable frame moving upon said side portions, plows carried by said frame and means for engaging the tops of the beets and dragging them free of the soil.

5. A beet-harvester comprising a vehicle, an angle-iron yoke forming the main frame of said vehicle, the flanges of said angle-iron being turned inwardly to form guides, a channel-iron yoke engaging said guides and beet-digging means carried by said inner yoke.

6. A beet-harvester comprising a vehicle, a guiding-truck therefor, made up of a yoke composed of angle-irons, a channel-iron yoke moving within the angle-iron yoke, plows attached to the channel-iron yoke and beet-top-engaging means also carried by the said yoke and coöperating with the plows for pulling the beets out of the ground.

7. A beet-harvester comprising a truck formed of arched angle-bars spread at their upper ends and drawn together at their lower ends to form guides, the inwardly-extending flanges of the lower portions being parallel, a sliding frame mounted in the truck and formed of a channel-bar arched and having its flanges extending outwardly and embracing the inturned flanges of the truck, plows carried by the said frame, and beet-loosening mechanism also carried by the said frame.

8. A beet-harvester comprising a plow-carrying truck, a beet-engaging chain mounted in said truck, and integral forks carried by the links of said chain for engaging the beets.

9. A beet-harvester comprising a frame, means for digging beets from the ground, means for pulling the beets free from the earth comprising a chain, prongs having flaring arms projecting from the links of said chain capable of shaking the beet-plants free from the soil.

10. A beet-harvester comprising a frame, beet-digging mechanism carried thereby, means for extracting beet-plants from the earth and moving them to a suitable point in the machine comprising traveling chains, beet-engaging means projecting from some of said chains consisting in integral yokes provided with outwardly-flaring arms, and means for actuating said chains.

11. A beet-harvester comprising a truck made up of an outer yoke and an inner movable yoke, plows carried by the inner yoke, a beet-pulling endless chain also mounted in the inner yoke, jointed driving mechanism connecting the chain with a power-shaft, the said power-shaft finding bearings in the outer yoke, and means for raising and lowering the inner yoke.

12. A beet-harvester comprising a vehicle, digging means carried thereby, a beet-manipulating means operating in conjunction therewith, means for actuating the said manipulating means comprising endless chains, gearing operated thereby, and a jointed frame carrying the said gearing, the jointed frame permitting of the elevation or depression of the digging and beet-manipulating mechanism without interfering with their operation.

In testimony whereof I hereunto affix my signature in presence of two witnesses.

JOHN BEAL.

Witnesses:
CYRUS S. CLASON,
GEORGE S. CLASON.